(12) United States Patent
Badura et al.

(10) Patent No.: US 8,772,641 B2
(45) Date of Patent: Jul. 8, 2014

(54) CABLE STRAIN RELIEF DEVICE FOR CABLE CLOSURES AND CABLE CLOSURE HAVING AT LEAST ONE SUCH CABLE STRAIN RELIEF DEVICE

(75) Inventors: Stefan Badura, Menden (DE); Mike Breuer-Heckel, Dortmund (DE)

(73) Assignee: CCS Technology, Inc., Wilmington, DE (US)

( * ) Notice: Subject to any disclaimer, the term of this patent is extended or adjusted under 35 U.S.C. 154(b) by 197 days.

(21) Appl. No.: 13/463,426

(22) Filed: May 3, 2012

(65) Prior Publication Data
US 2012/0279745 A1 Nov. 8, 2012

(30) Foreign Application Priority Data
May 5, 2011 (EP) .................................... 11164932

(51) Int. Cl.
| | |
|---|---|
| *H01B 7/00* | (2006.01) |
| *H01R 4/00* | (2006.01) |
| *H01B 5/00* | (2006.01) |
| *H02B 1/20* | (2006.01) |
| *G02B 6/00* | (2006.01) |
| *H02G 15/113* | (2006.01) |
| *H02G 15/007* | (2006.01) |
| *G02B 6/44* | (2006.01) |
| *H01R 13/58* | (2006.01) |
| *H01R 12/77* | (2011.01) |

(52) U.S. Cl.
CPC ............ *H02G 15/113* (2013.01); *H02G 15/007* (2013.01); *G02B 6/4471* (2013.01); *H01R 13/5812* (2013.01); *H01R 12/772* (2013.01)
USPC ....... 174/135; 174/72 R; 174/126.1; 361/826; 385/135

(58) Field of Classification Search
CPC .......................... B60R 16/0215; H01R 13/562
USPC ............ 174/135, 50, 72 R; 361/826; 385/135
See application file for complete search history.

(56) References Cited

U.S. PATENT DOCUMENTS

| 3,632,071 A | 1/1972 | Cameron et al. .......... 248/74 PB |
|---|---|---|
| 4,071,136 A * | 1/1978 | Jones ............................. 198/718 |

(Continued)

FOREIGN PATENT DOCUMENTS

| DE | 6915116 | 4/1969 |
|---|---|---|
| DE | 2063097 | 5/1972 |

(Continued)

OTHER PUBLICATIONS

Patent Cooperation Treaty International Search Report, Application No. PCT/US2012/036057, Jul. 10, 2012, 2 pages.

*Primary Examiner* — Timothy Thompson
*Assistant Examiner* — Sherman Ng

(57) ABSTRACT

Cable strain relief device for a cable closure, having at least one cable guiding element, whereby a cable to be restrained can be fixed at a respective cable guiding element via a cable tie surrounding the cable to be restrained and the respective cable guiding element, whereby on both sides of the at least one cable guiding element there are positioned cable tie guiding elements providing guiding surfaces, whereby the guiding surface of a first cable tie guiding element being positioned at a first side of the cable guiding element, namely at the cable tie entry side of the same, has a smaller distance from the cable guiding element than the guiding surface of a second cable tie guiding element being positioned at a second side of the cable guiding element, namely at the cable tie exit side of the same.

11 Claims, 6 Drawing Sheets

(56) References Cited

U.S. PATENT DOCUMENTS

| | | | |
|---|---|---|---|
| 4,561,715 A * | 12/1985 | Sanchez | 439/449 |
| 4,693,539 A | 9/1987 | Tighe, Jr. | 439/465 |
| 5,514,007 A * | 5/1996 | Rodrigues | 439/469 |
| 5,553,186 A * | 9/1996 | Allen | 385/135 |
| 5,668,910 A * | 9/1997 | Arnett | 385/134 |
| 5,731,546 A * | 3/1998 | Miles et al. | 174/135 |
| 5,758,004 A | 5/1998 | Alarcon et al. | 385/135 |
| 6,152,767 A * | 11/2000 | Roosen et al. | 439/587 |
| 6,215,939 B1 | 4/2001 | Cloud | 385/135 |
| 6,573,455 B1 | 6/2003 | Radelet | 174/92 |
| 6,625,373 B1 * | 9/2003 | Wentworth et al. | 385/134 |
| 6,802,512 B2 * | 10/2004 | Muller et al. | 277/607 |
| 2002/0131749 A1 * | 9/2002 | Swenson et al. | 385/135 |
| 2003/0081396 A1 | 5/2003 | Smith | 361/801 |
| 2005/0276562 A1 * | 12/2005 | Battey et al. | 385/135 |
| 2008/0273854 A1 * | 11/2008 | Hendrickson et al. | 385/135 |
| 2009/0136195 A1 * | 5/2009 | Smrha et al. | 385/135 |
| 2010/0202745 A1 | 8/2010 | Sokolowski et al. | 385/135 |

FOREIGN PATENT DOCUMENTS

| | | |
|---|---|---|
| DE | 3512165 A1 | 10/1985 |
| DE | 8914665 | 2/1990 |
| EP | 0421246 B1 | 3/1994 |
| EP | 2216667 B1 | 8/2010 |
| WO | WO 94/09533 | 4/1994 |
| WO | WO 97/02635 | 1/1997 |
| WO | WO 97/27655 | 7/1997 |
| WO | WO2008/051671 A1 | 5/2008 |

* cited by examiner

CABLE STRAIN RELIEF DEVICE FOR CABLE CLOSURES AND CABLE CLOSURE HAVING AT LEAST ONE SUCH CABLE STRAIN RELIEF DEVICE

RELATED APPLICATIONS

This application claims the benefit of priority under 35 U.S.C. §119 of European Patent Application Serial No. EP11164932 filed on May 5, 2011, the content of which is relied upon and incorporated herein by reference in its entirety.

BACKGROUND

The disclosure relates generally to closures and more particularly to closures having integral cable strain relief devices that are integral to the closure itself.

Cable closures are used in telecommunications cable networks for protecting spliced joints at connection points between two telecommunications cables and for protecting branch points or splitting points of telecommunications cables. In this case, the cable closures need to ensure the continuity of the telecommunications cables as though the telecommunications cables had not been interrupted.

The product catalog "Accessories for Fiber Optic Networks, Edition 1, page 75, Corning Cable Systems, 2001" discloses cable closures firstly in the form of inline cable closures and secondly in the form of dome cable closures, which all have a housing which defines an interior of the cable closure and seals off the interior thereof from the outside. Conventionally, assemblies for connecting, namely for splicing, telecommunications conductors guided in telecommunications cables are arranged in the interior defined by the housing of the cable closure.

In the case of cable closures in the form of dome cable closures, the housing is formed by a dome-like covering body and a sealing body, the sealing body de-fining cable insertion regions, which are sealed off on one side of the dome-like covering body and via which all of the cables can be inserted into the interior of the cable closure.

In the case of cable closures in the form of inline cable closures, cable insertion regions which are sealed off on two opposite sides of the covering body are formed for inserting cables into the interior of the cable closure, with the result that inline cable closures can be installed in one line with the cables.

DE 20 2010 006 582 U1 discloses an inline cable closure, having a housing, which delimits an interior of the cable closure and seals off the cable closure toward the outside, said housing comprising a covering body, said covering body comprises half-shells and provides on mutually opposite sides of the same cable insertion regions for inserting cables into said interior of the cable closure and/or for passing cables out of said interior of the cable closure, wherein compressible and/or deformable sealing elements are positioned at said mutually opposite sides of said covering body in the region of said half-shells. According to DE 20 2010 006 582 U1 the cable closure comprises on said mutually opposite sides of the covering body a cable strain relief device, each cable strain relief device having two cable guiding elements, whereby a cable to be re-strained can be fixed at a respective cable guiding element via a cable tie surrounding the cable to be restrained and the respective cable guiding element.

Against this background, the present patent application provides a novel cable strain relief device for a cable closure having improved guiding properties for the cable ties.

This is accomplished by the feature that on both sides of the at least one cable guiding element there are positioned cable tie guiding elements providing guiding surfaces, whereby the guiding surface of a first cable tie guiding element being positioned at a first side of the cable guiding element, namely at the cable tie entry side of the same, has a smaller distance from the cable guiding element than the guiding surface of a second cable tie guiding element being positioned at a second side of the cable guiding element, namely at the cable tie exit side of the same.

These guiding surfaces provide an easy and reliable guiding for the cable tie when using the same to fix a cable to be restrained at the respective cable guiding element.

According to an exemplary embodiment, on both sides of the at least one cable guiding element there are positioned cable tie guiding elements having arc segmented guiding surfaces, whereby the arc segmented guiding surface of a first cable tie guiding element being positioned at the first side of the cable guiding element, namely at the cable tie entry side of the same, has a smaller radius than the arc segmented guiding surface of the second cable tie guiding element being positioned at the second side of the cable guiding element, namely at the cable tie exit side of the same. In exemplary embodiments, a center point of the arc segmented guiding surface of a first cable tie guiding element and a center point of the arc segmented guiding surface of a first cable tie guiding element have a different distance from the respective cable guiding element. This provides an exemplary guiding function for the cable tie.

Exemplary embodiments of the disclosure will be explained in more detail, with-out any restriction being imposed, with reference to the drawing, in which:

DESCRIPTION

Figure 1:
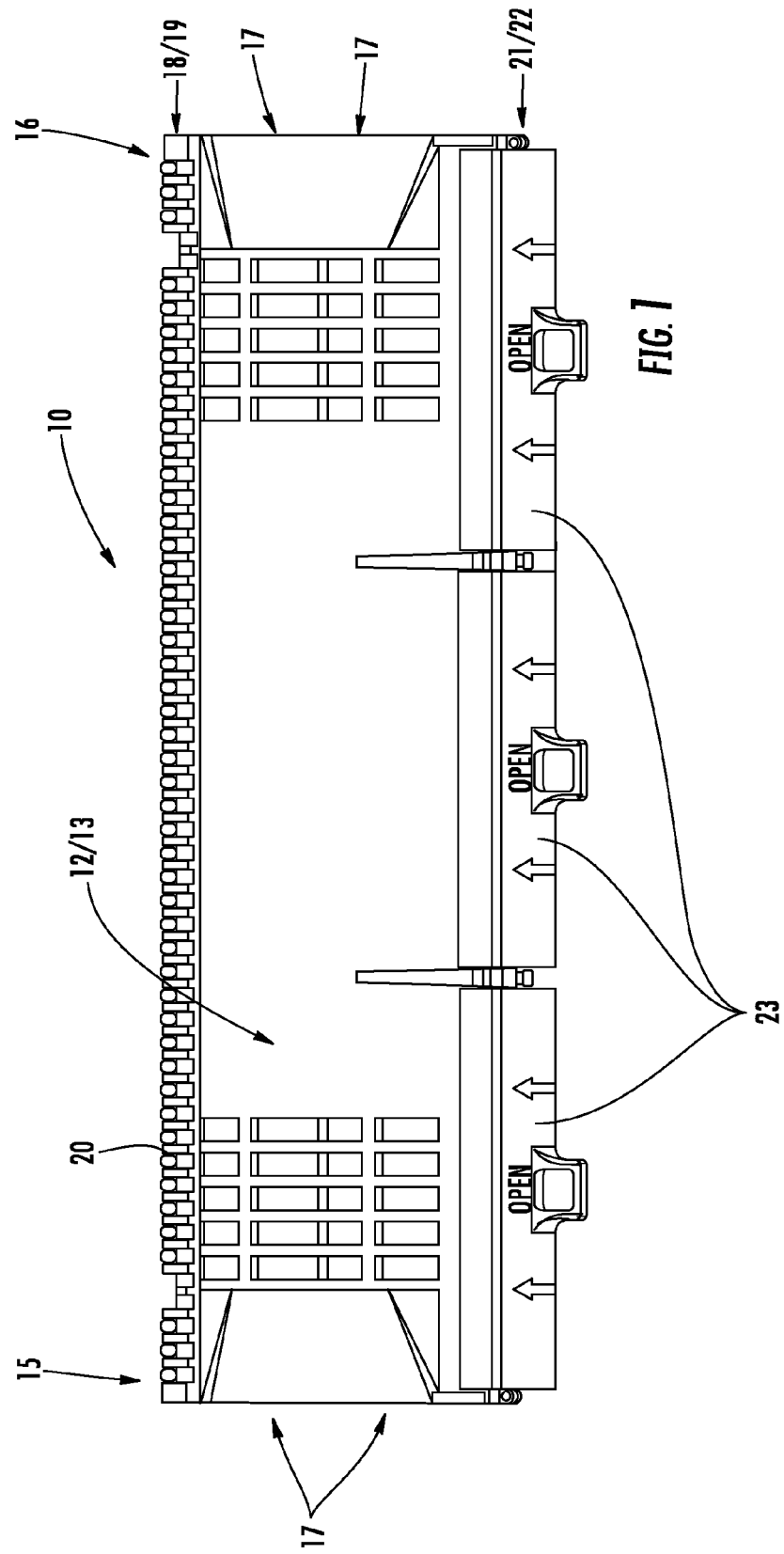
FIG. 1 is a perspective view of an exemplary embodiment of an inline cable closure in a closed status of the same.

Reference is now made in detail to the present embodiments of the disclosure, examples of which are illustrated in the accompanying drawings. Whenever possible, identical or similar reference numerals are used throughout the drawings to refer to identical or similar parts. It should be understood that the embodiments disclosed herein are merely examples with each one incorporating certain benefits of the present disclosure. Various modifications and alterations may be made to the following examples within the scope of the present disclosure, and aspects of the different examples may be mixed in different ways to achieve yet further examples. Accordingly, the true scope of the disclosure is to be understood from the entirety of the present disclosure in view of, but not limited to the embodiments described herein.

Figure 2:
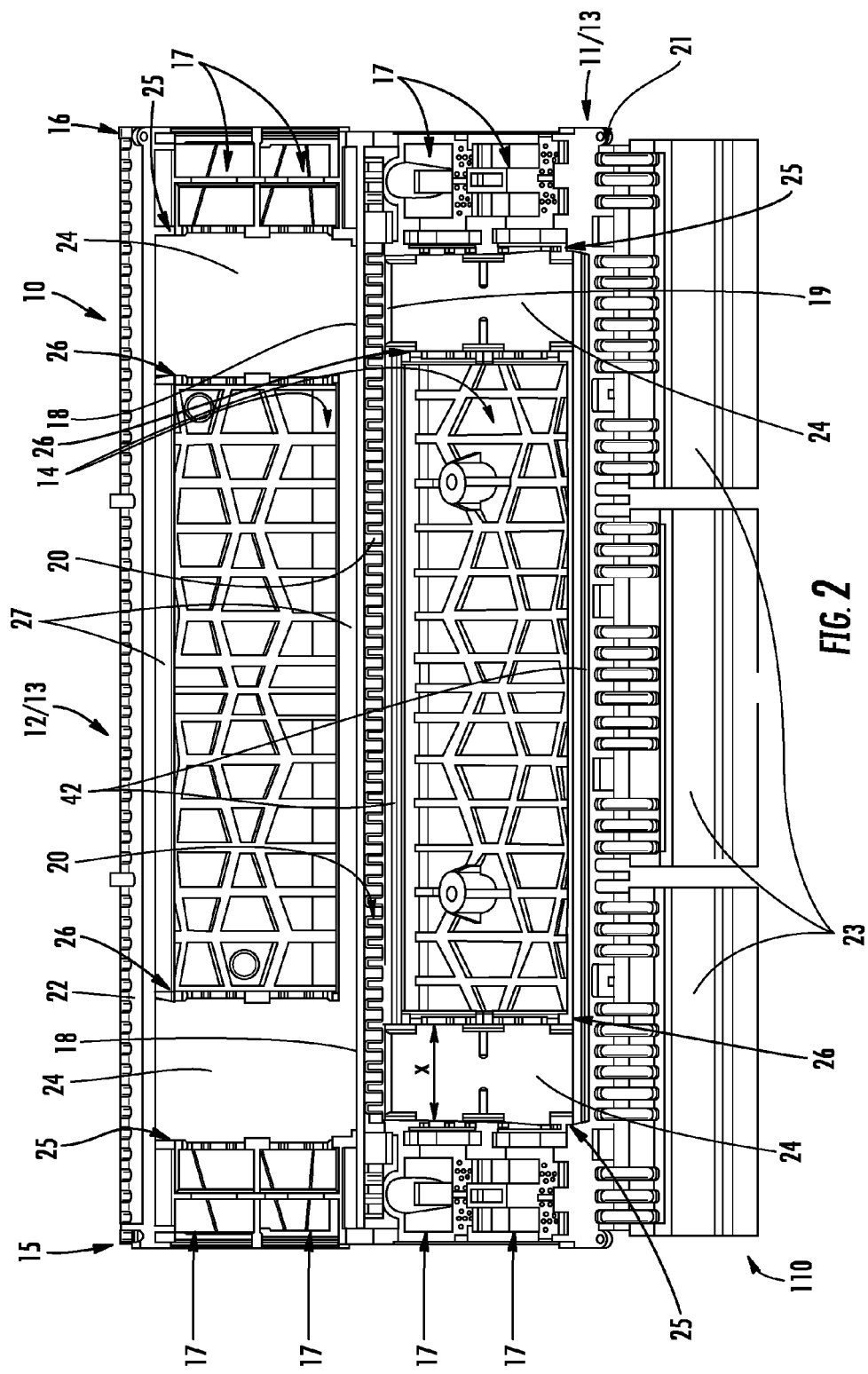
FIG. 2 is a perspective view of the inline cable closure of FIG. 1 in an opened status of the same.
Figure 3:
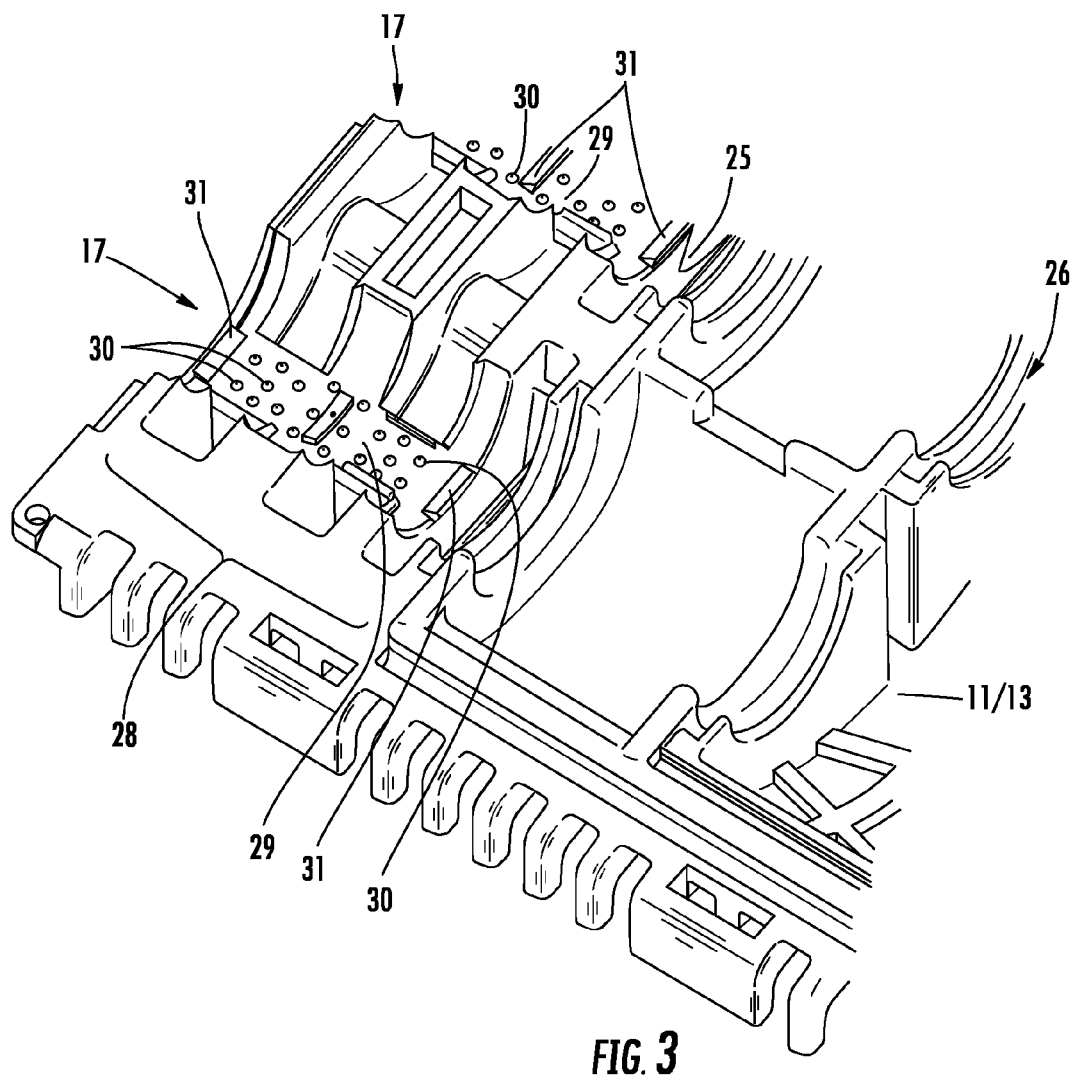
FIG. 3 is a detail of a first, lower half-shell of the inline cable closure.

FIGS. 1 and 2 each show a cable closure in the form of an inline cable closure 10, which in the embodiment shown comprises a housing which is formed by a covering body 13 composed of two half-shells 11 and 12. As defined in the present disclosure, an in-line closure, for example, may define a closure that has cables entering and exiting on opposite sides of the closure, some of which may have optical fibers routed into the closure and some of which may not have optical fibers routed into the closure. In the exemplary embodiment shown, the half-shell 11 is a so-called lower shell and the half-shell 12 is a so-called upper shell of the covering body 13, which together define an interior 14 of the cable closure 10.

Cable insertion regions 17 are formed on mutually opposite sides 15 and 16 of the inline cable closure 10 or the covering body 13, with it being possible for cables to be inserted into the interior 14 of the inline cable closure 10 or passed out of said interior.

In the exemplary embodiment shown, in each case two cable insertion regions 17 for inserting in each case one cable into the interior 14 of the inline cable closure 10 are formed on both mutually opposite sides 15 and 16 of the covering body 13.

In the shown embodiment, the two half-shells 11 and 12 are hinged together at first longitudinal sides 18, 19 of the same. The half-shells 11 and 12 can be pivoted with respect to each other around a hinge 20 by which said two half-shells 11 and 12 are fixed to each other at said first longitudinal sides 18, 19 of the same. When the inline cable closure 10 is closed, the other second longitudinal sides 21, 22 of the two half-shells 11 and 12 can be secured to each other by a closing mechanism 23, which is in the shown embodiment assigned to the half-shell 11.

In order to ensure that the cables to be inserted into the interior 14 of the inline cable closure 10 via the cable insertion shows a detail of a first, lower half-shell of the inline cable closure s 17 are sealed off, compressible and/or deformable sealing elements 24, which are each arranged between barrier walls 25 and 26, are positioned in the region of both mutually opposite sides 15 and 16 of the covering body 13 of the inline cable closure 10 on which the cable insertion regions 17 are formed, both in the region of the lower half-shell 11 and in the region of the upper half-shell 12.

A first barrier wall 25 is in each case, namely on both mutually opposite sides 15 and 16 in the region of the lower half-shell 11 and in the region of the upper half-shell 12, remote from the interior 14 of the inline cable closure 10 while a second barrier walls 26 is in each case facing the interior 14 of the cable closure 10.

As shown in FIG. 2, the compressible and/or deformable sealing elements 24 of the upper half-shell 12, which are associated with the cable insertion regions 17, are coupled via compressible and/or deformable sealing elements 27, which run parallel to longitudinal edges of the upper half-shell 12. As a result, an annular, closed sealing region is formed by the sealing elements 24 and 27 in the region of the upper half-shell 12. Possibly, an analogous sealing region can also be formed in the region of the lower half-shell 11.

The compressible and/or deformable sealing elements 24 and possibly 27 are, in exemplary embodiments, gel-like sealing elements, for example polyurethane gels or silicone gels. Such gel-like sealing elements are deformable and can be compressible.

It is also possible to use sealing elements 24 which are partially composed of different materials, for example from a deformable, gel-like sealing material and from a foam-like compressible sealing material.

Each of said barrier walls 25 and 26, namely both the barrier walls 25 remote from the interior 14 and the barrier walls 26 facing the interior 14, extends transversely with respect to an insertion direction of the cable insertion regions 17.

The cable closure in the form of an inline cable closure 10 shown in FIGS. 1 and 2 comprises on both of said mutually opposite sides 15 and 16 a cable strain relief device 28 being an integral part of the lower half-shells 11 of the covering body 13 of the cable closure 10. Each cable strain relief device 28 is positioned completely inside the interior 14 of the covering body 13.

Fat least one of said cable insertion regions 17 provided at said mutually opposite sides 15 and 16 the respective cable strain relief device 28 provides one cable guiding element 29, whereby a cable (not shown) to be restrained can be fixed at a respective cable guiding element 29 via a cable tie (not shown) surrounding the cable to be restrained and the respective cable guiding element 29.

Each cable guiding element 29 comprises projections 30, 31 which engage in a cable sheath of the respective cable to be restrained at the respective cable guiding element 29 when the same is fixed at the cable guiding element 29 by using a cable tie. First projections 30 are spiky and send projections 31 are stripy.

Figure 4:
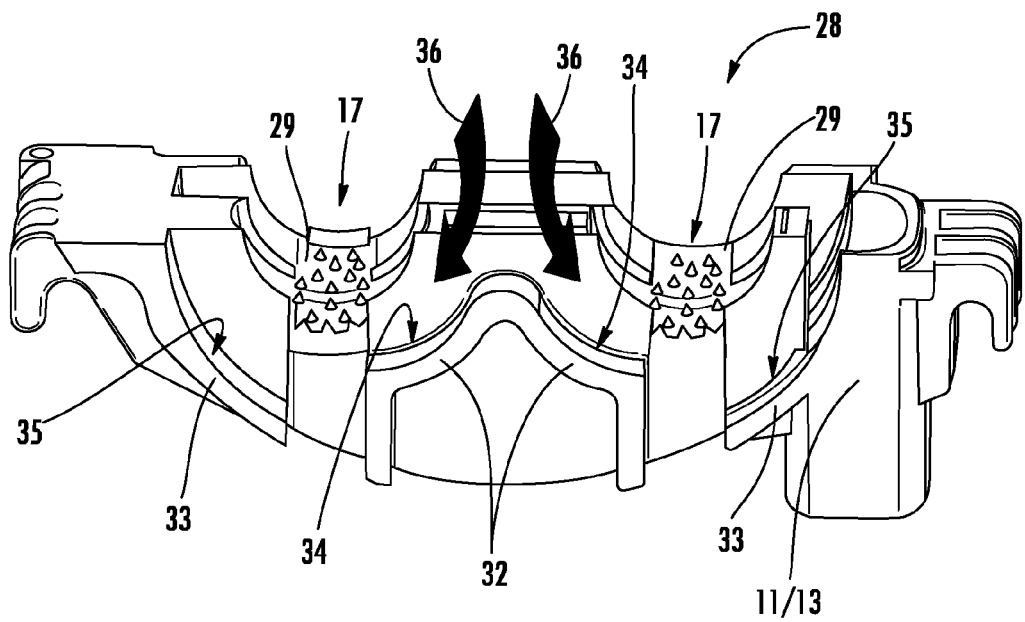
FIG. 4 is another detail of the first, lower half-shell of the inline cable closure.

As can be best seen in FIG. 4, on both sides of the at least one cable guiding element 29 there are positioned cable tie guiding elements 32, 33 providing guiding surfaces 34, 35, whereby the guiding surface 34 of a first cable tie guiding element 32 being positioned at a first side of the cable guiding element, namely at the cable tie entry side of the same, has a smaller distance from the cable guiding element 29 than the guiding surface 35 of a second cable tie guiding element 33 being positioned at a second side of the cable guiding element, namely at the cable tie exit side of the same. Arrows 36 show the guiding direction of a cable tie at the cable tie entry side.

The cable tie guiding elements 32, 33 in exemplary embodiments have arc segmented guiding surfaces 34, 35, whereby the arc segmented guiding surface 34 of a first cable tie guiding element 32 being positioned at the first side of the cable guiding element 29, namely at the cable tie entry side of the same, has a smaller radius than the arc segmented guiding surface 35 of a second cable tie guiding element 33 being positioned at the second side of the cable guiding element 29, namely at the cable tie exit side of the same. These arc segmented guiding surfaces 34, 35 can be e.g. circular arced shaped or ellipsoid arced shaped guiding surfaces.

A cable tie used to fix a cable to be restrained at a respective cable guiding element 29 first contacts the arc segmented guiding surface 34 of the first cable tie guiding element 32 and then after passing the same contacts the arc segmented guiding surface 35 of the second cable tie guiding element 33. The cable tie will always be guided in a defend direction approximately 180° around the respective cable guiding element 29 and the cable to be restrained allowing an easy and reliable handling of the cable tie.

In exemplary embodiments, the center point of the arc segmented guiding surface 34 of the first cable tie guiding element 32 and the center point of the arc segmented guiding surface 35 of the second cable tie guiding element 34 have a different distance from the respective cable guiding element 29, whereby the center point of the arc segmented guiding surface 34 of the first cable tie guiding element 32 and the center point of the arc segmented guiding surface 35 of the second cable tie guiding element 33 have a different distance from the respective cable guiding element 29 in vertical direction and/or horizontal direction.

In the shown embodiment, these center points are located on a common vertical axis and have a different distance from the respective cable guiding element 29 in vertical direction only.

It is also possible, that these center points have a different distance from the respective cable guiding element 29 in vertical direction and in horizontal direction.

Figure 5:
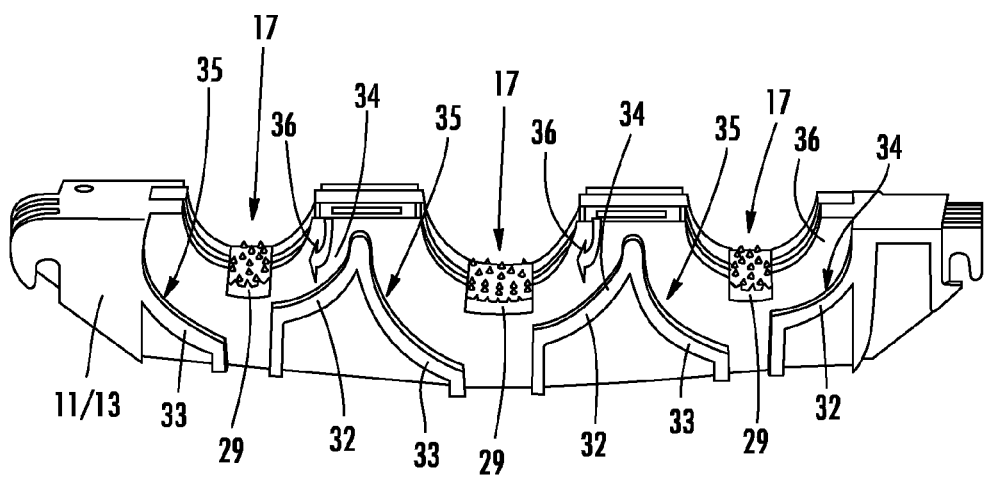
FIG. 5 is an alternative detail.

According to FIG. 4, the shown cable strain relief device 28 provides two cable guiding element 29. In the alternative of FIG. 5, the shown cable strain relief device 28 provides three cable guiding elements 29 each being positioned side by side, whereby on both sides of each cable guiding element 29 there are positioned said cable tie guiding elements 32, 33 having said arc segmented guiding surfaces 33, 34.

The cable insertion regions 17 and cable guiding elements 29 are matched to a defined diameter of cables to be inserted into the cable closure 10. When cables with smaller diameters are intended to be inserted into the inline cable closure 10, adapter pieces 37 can be positioned in the region of the cable insertion regions 17 in order to adapt the respective cable insertion region 17, via the respective adapter piece 37, to a smaller diameter of a cable to be inserted into the inline cable closure 10.

These adapter pieces 37 can be inserted into the cable insertion regions 17 and accommodated in cable guiding elements 29, which are designed for the maximum diameter of a cable to be inserted. Such adapter pieces 37 can if necessary be used in the region of each cable insertion region 17.

Figure 6:
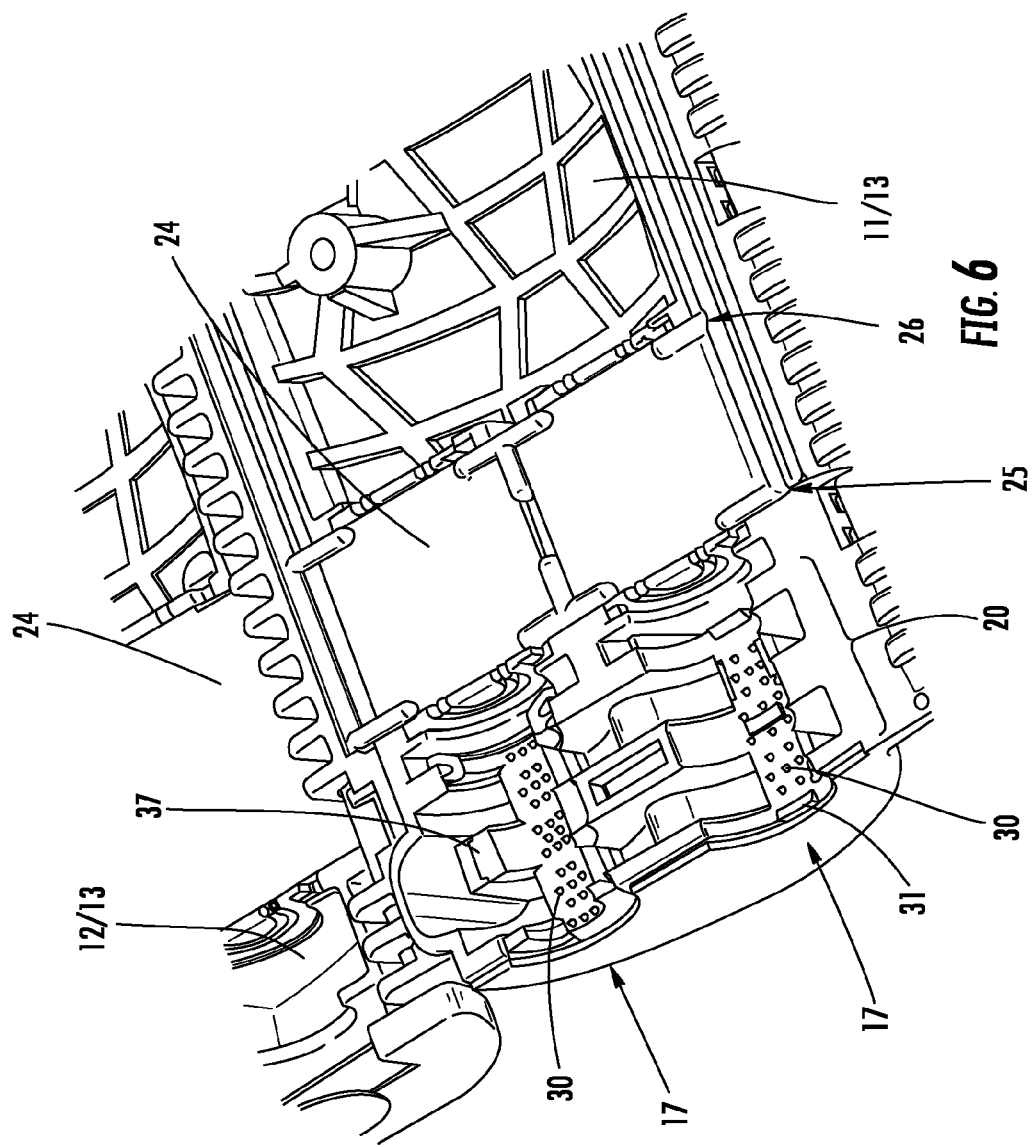
FIG. 6 is a detail of a first, lower half-shell of the inline cable closure together with an adapter piece positioned in one of the cable insertion region.

FIG. 6 shows that in one of the cable insertion regions 17 there is positioned an adapter piece 37 to adapt the respective cable insertion region 17 to a smaller diameter of a cable to be inserted into the inline cable closure 10.

Figure 7:
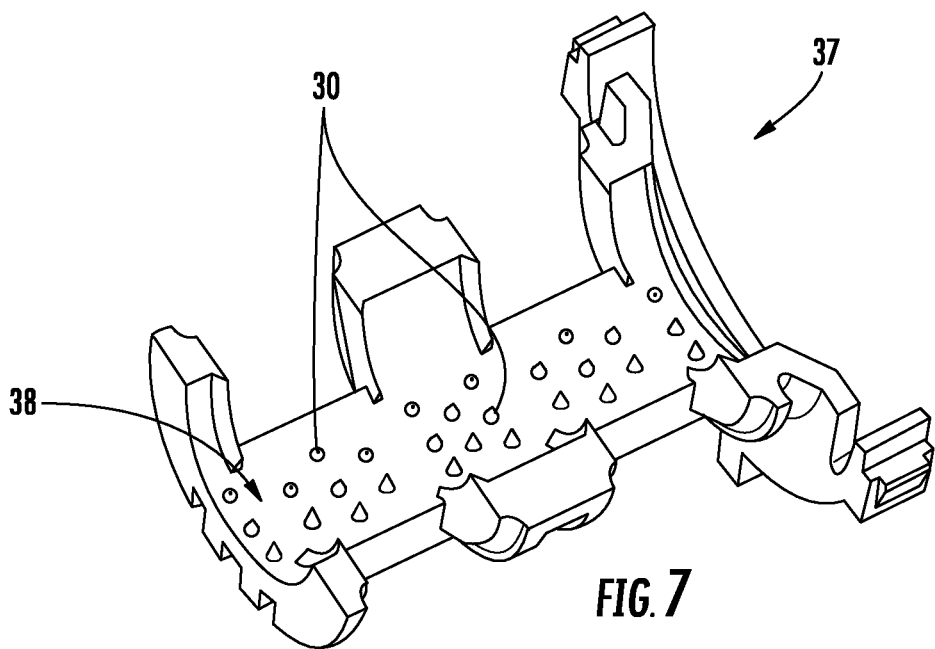
FIG. 7 is a first perspective view of the adapter piece.
Figure 8:
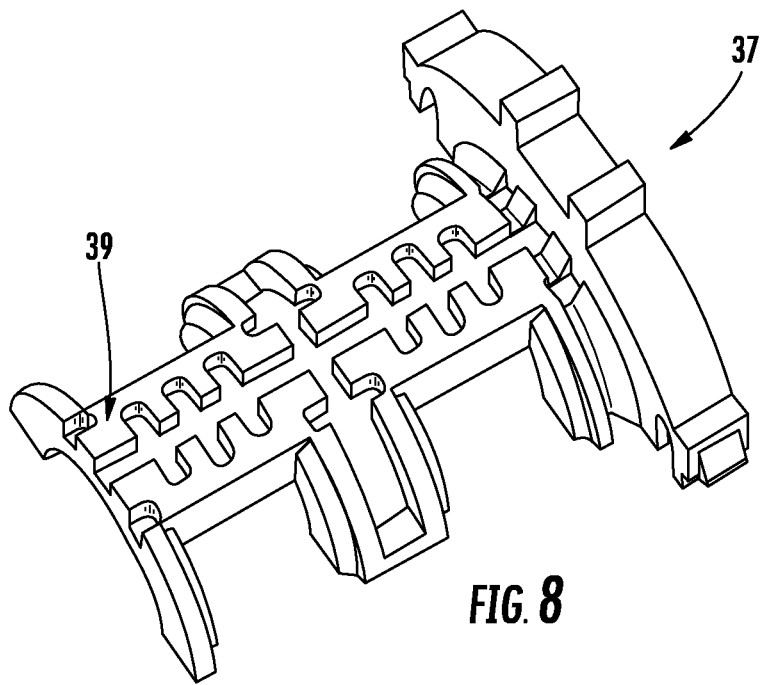
FIG. 8 is a second perspective view of the adapter piece.

As shown in FIGS. 7 and 8, the adapter piece 37 also comprises at an inner surface 38 spiky projections 30 which engage in a cable sheath of the respective cable to be restrained when the same is fixed at the adapter piece 37 being accommodated in cable guiding element 29. The adapter piece 37 may also comprise stripy projections 31.

An outer surface 39 of the adapter piece 37 corresponds to an inner surface of the cable guiding element 29 and cable insertion region 17 in which the adapter piece 37 my be accommodated.

List of Reference Numerals
10 inline cable closure
11 half-shell/lower half-shell
12 half-shell/upper half-shell
13 covering body
14 interior
15 side
16 side
17 cable insertion region
18 longitudinal side
19 longitudinal side
20 hinge
21 longitudinal side
22 longitudinal side
23 closing mechanism
24 sealing element
25 barrier wall
26 barrier wall
27 sealing element
28 cable strain relief device
29 cable guiding element
30 projection
31 projection
32 cable tie guiding element
33 cable tie guiding element
34 guiding surface
35 guiding surface
36 guiding direction for cable tie
37 adapter piece
38 inner surface
39 outer surface Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A cable strain relief device for a cable closure, comprising:
    at least one cable guiding element, whereby a cable to be restrained can be fixed at a respective cable guiding element via a cable tie surrounding the cable to be restrained and the respective cable guiding element,
    wherein on both sides of the at least one cable guiding element there are positioned cable tie guiding elements providing guiding surfaces, whereby the guiding surface of a first cable tie guiding element being positioned at a first side of the cable guiding element, namely at the cable tie entry side of the same, has a smaller distance from the cable guiding element than the guiding surface of a second cable tie guiding element being positioned at a second side of the cable guiding element, namely at the cable tie exit side of the same; and
    wherein the guiding surfaces of the cable tie guiding elements are arc segmented guiding surfaces, the arc segmented guiding surface of the first cable tie guiding element having a smaller radius than the arc segmented guiding surface of the second cable tie guiding element.

2. The cable strain relief device as claimed in claim 1, wherein a center point of the arc segmented surface of the first cable tie guiding element and a center point of the arc segmented surface of the second cable tie guiding element have a different distance from the respective cable guiding element.

3. The cable strain relief device as claimed in claim 2, wherein the center point of the arc segmented surface of the first cable tie guiding element and the center point of the arc segmented surface of the second cable tie guiding element have a different distance from the respective cable guiding element in a vertical direction.

4. The cable strain relief device as claimed in claim 2, wherein the center point of the arc segmented surface of the first cable tie guiding element and the center point of the arc segmented surface of the second cable tie guiding element have a different distance from the respective cable guiding element in a horizontal direction.

5. The cable strain relief device as claimed in claim 2, wherein the center points are located on a common vertical axis and have a different distance from the respective cable guiding element in a vertical direction.

6. The cable strain relief device as claimed in claim 1, wherein the at least one cable guiding element comprises projections which engage in the cable sheath of the respective cable to be restrained at the respective cable guiding element.

7. The cable strain relief device as claimed in claim 6, wherein the same comprises at least two cable guiding elements being positioned side by side, whereby on both sides of each cable guiding element there are positioned said cable tie guiding elements having said guiding surfaces.

8. A cable closure, the closure comprising:
a housing, the housing delimiting an interior of the cable closure and sealing off the cable closure toward the outside, said housing comprising a covering body providing cable insertion regions for inserting cables into said interior of the cable closure and for passing cables out of said interior of the cable closure;
at least one deformable sealing element, the at least one deformable sealing element being positioned in the region of said cable insertion regions;
at least one cable strain relief device, the at least one cable strain relief device including at least one cable guiding element, whereby a cable to be restrained can be fixed at a respective cable guiding element via a cable tie surrounding the cable to be restrained and the respective cable guiding element;
wherein on both sides of the at least one cable guiding element there are positioned cable tie guiding elements providing guiding surfaces, whereby the guiding surface of a first cable tie guiding element being positioned at a first side of the cable guiding element, namely at the cable tie entry side of the same, has a smaller distance from the cable guiding element than the guiding surface of a second cable tie guiding element being positioned at a second side of the cable guiding element, namely at the cable tie exit side of the same; and
wherein the guiding surfaces of the cable tie guiding elements are arc segmented guiding surfaces, the arc segmented guiding surface of the first cable tie guiding element having a smaller radius than the arc segmented guiding surface of the second cable tie guiding element.

9. The cable closure as claimed in claim 8, the closure defining an inline cable closure, whereby said covering body comprising half-shells and providing on mutually opposite sides of the covering body cable insertion regions for inserting cables into said interior of the cable closure and for passing cables out of said interior of the cable closure, whereby one cable strain relief device is assigned to each of the mutually opposite sides of one of said half-shells.

10. The cable closure as claimed in claim 9, wherein each cable strain relief device is an integral part of the respective said half-shells.

11. The cable closure as claimed in claims 9, wherein each cable strain relief device is positioned completely inside the interior of the covering body.

* * * * *